Figure 1:
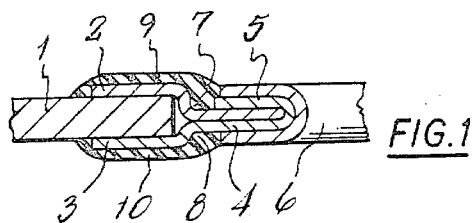

United States Patent [19]

Barker et al.

[11] 4,317,576

[45] Mar. 2, 1982

[54] GASKETS

[75] Inventors: Clinton B. Barker, Kidmore End; Martin E. J. Wright, High Wycombe, both of England

[73] Assignee: Engineering Components Limited, Slough, England

[21] Appl. No.: 90,858

[22] Filed: Nov. 2, 1979

[30] Foreign Application Priority Data

Nov. 3, 1978 [GB] United Kingdom ............... 43069/78

[51] Int. Cl.³ ............................................. F16J 15/12
[52] U.S. Cl. ................................................ 277/235 B
[58] Field of Search ..................... 277/166, 235 B, 229

[56] References Cited

FOREIGN PATENT DOCUMENTS 2713542 10/1978 Fed. Rep. of Germany ... 277/235 B

Primary Examiner—Robert I. Smith
Attorney, Agent, or Firm—Stevens, Davis, Miller & Mosher

[57] ABSTRACT

A gasket has an eyelet attached to a flat body portion 1 and the eyelet includes primary (6) and secondary (2,3) sealing zones. An annular seal of a rubber sealing material (9,10) is deposited on the eyelet at least between the primary and secondary sealing zones.

The seal of rubbery material may also extend over part or all of the secondary sealing portion of the eyelet and may extend on to the body portion.

7 Claims, 3 Drawing Figures

GASKETS

The invention relates to gaskets, and in particular to gaskets of the kind in which apertures are provided with eyelets having primary and secondary sealing portions.

Gaskets are used for sealing joints between rigid bodies to prevent escape of gases or fluid from one or more cavities or passages in at least one of the bodies. The invention is primarily concerned with gaskets for sealing joints that are subject to heat and vibration, such as cylinder head joints in reciprocating internal combustion engines, particularly the engines of motor vehicles.

An object of the invention is to provide a form of gasket that can effectively withstand the cylinder pressures which arise in modern engines, and in particular provide an improved seal during the initial "bedding in" period in the early life of the engine and during gasket testing.

The invention is based on gaskets of the type wherein eyelets having primary and secondary sealing portions are used. A gasket of this kind is described and claimed in UK patent specification No. 1,260,236 which provides a gasket comprising a flat body portion formed with an aperture, a primary sealing ring located within the aperture and attached to the body portion and secondary sealing means of flat annuli located on opposite faces of the body portion and extending into the aperture to provide attachment for the primary sealing ring, said annuli covering said faces of the body portion only in those regions adjacent the aperture.

According to the present invention there is provided a gasket comprising a flat body portion formed with an aperture, said aperture containing an eyelet attached to the edge of said flat body portion, the eyelet including primary and secondary sealing coaxial annular portions, wherein an annular seal of a rubbery sealing material is deposited on said eyelet at least between said primary and secondary sealing portions.

The rubbery sealing material is a heat and chemical resistant material such as a silicone rubber. It may conveniently be provided also on the secondary sealing portion of the eyelet as a layer of thickness up to, for example, 0.1 mm.

In the gaskets described in the UK patent specification No. 1,260,236 their construction results in a groove located between the primary and secondary sealing portions of the eyelet. In the present invention this groove is filled with the rubbery sealing material.

The rubbery sealing material is preferably applied to the gasket in a fluid state and subsequently set. A suitable method of application is the screen printing method. In this method a screen is used in which the design to be printed appears as areas of open mesh in the screen, the remainder of the screen being blanked. A quantity of curable liquid rubber composition is provided at one end of the screen and wiped across the screen by means of a squeegee in the usual manner of screen printing with the screen accurately superimposed on the gasket to be printed. Liquid rubber passes through the screen only in the desired areas thus providing a print on the gasket. The screen is then lifted away and the gasket removed, the rubber composition setting to form a sealing material.

The screen may be of a monofilament mesh such as nylon, polyester or steel, and the liquid rubber composition is preferably a curable composition e.g. an air-curing composition or a heat curable composition such as one containing a curing catalyst.

The body portion of the gasket may consist of any known gasket body material, such as copper or steel clad asbestos compound, compressed asbestos fibre compound or beater-processed or rubber material having a metallic core. The eyelet portion of the gasket will generally be of sheet metal, eg steel.

Figure 2:
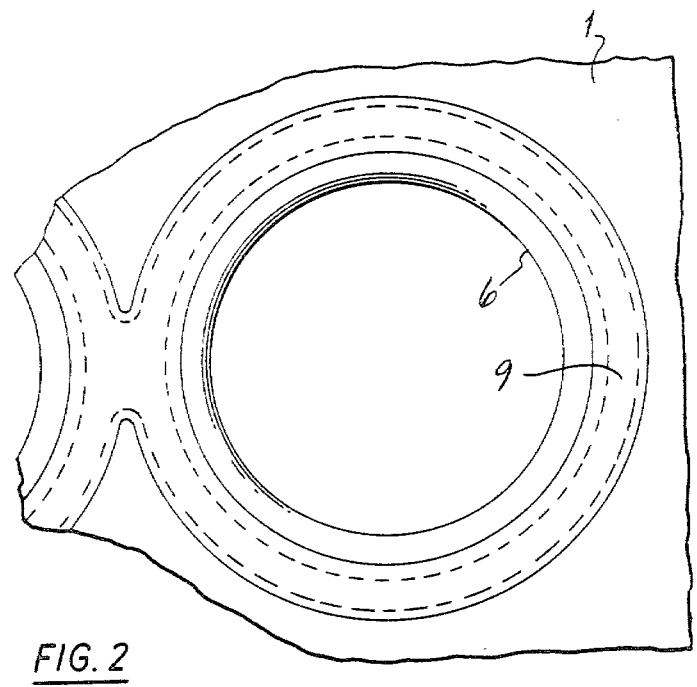
Figure 3:
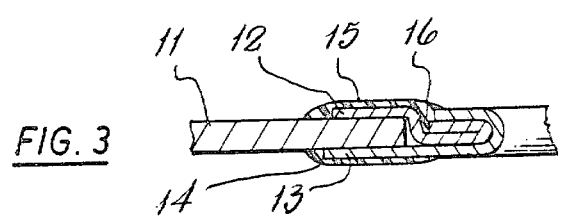

An embodiment of the invention will now be described, by way of example only, with reference to the accompanying drawings of which:

FIG. 1 is a sectional elevation of a portion of a gasket in accordance with the invention, FIG. 2 is a plan diagram of a portion of the gasket of FIG. 1, and FIG. 3 is a sectional elevation of an portion of a further gasket in accordance with the invention.

As shown in FIG. 1 the gasket consists of a body portion 1 and an eyelet which is constructed from sheet metal. The eyelet includes a pair of flat metal annuli 2,3 on opposite faces of the body portion 1. Within an aperture in the body portion these annuli are brought together face to face to provide an annular flange 4 with one of the laminations of metal folded over the other to constitute a bead 5. This beaded flange provides a support for a primary sealing member 6 which is folded about the flange.

Metal annuli 2 and 3 constitute the secondary sealing portion and are each separated from the portion 6 by annular grooves 7 and 8.

A rubbery sealing material is deposited on both faces of the eyelet to form rubbery layers 9 and 10 filling the grooves 7 and 8 and extending over the secondary sealing portions onto the surfaces of the body member.

FIG. 2 shows in plan a part of the gasket including the whole of one eyelet and aperture, and part of another, as in a cylinder head gasket. The edges of the area of the gasket covered by a layer of rubbery sealing material 9 are indicated by unbroken lines. The outer broken line shows the extent of the flat annulus 2 and the inner broken line shows the radially outer extent of the groove 7.

It will be appreciated that whilst the gasket shown in FIG. 2 has siamesed eyelets, this is not an essential feature.

The minimum requirement in the invention is that the rubbery sealing material should fill the grooves 7 and 8 in the eyelet. In the case illustrated by the drawings the rubber also extends over the secondary sealing portion of the eyelet, further enhancing the sealing capability of the resulting gasket.

In the gasket shown in FIG. 3 the gasket again consists of a body portion 11 and an eyelet which is constructed from sheet metal. However, the eyelet is flat on one side, consisting of two metal annuli 12 and 13 and of which overlaps one surface of the body portion 11, the other overlapping the other surface of the body portion.

The metal annulus 12 is folded over on its inner edge, the fold being inside a corresponding fold of the annulus 13, both folds lying in the same direction forming a ring whose thickness is four layers of the metal sheet which constitutes a primary sealing portion of the gasket. The portions of the metal annuli 12 and 13 which override the body portion constitute the secondary sealing portions of the eyelet, and there is a groove 16 on one side only of the gasket.

A rubbery sealing material is deposited on both faces of the gasket to form rubbery layers 14 and 15, layer 15 filling the groove 16 and both layers 14 and 15 extending over the secondary sealing portions of the eyelet onto the surface of the body portion 11 of the gasket.

We claim:

1. A gasket comprising a flat body portion formed with an aperture, said aperture containing an eyelet attached to the edge of said flat body portion, the eyelet including primary and secondary sealing coaxial annular portions, said primary and secondary sealing portions being separated by a groove, and an annular seal of a rubbery sealing material deposited on said eyelet at least between said primary and secondary sealing portions, said sealing material filling said groove.

2. A gasket according to claim 1 in which the primary and secondary sealing portions of the eyelet are separated by a groove on both faces of the gasket, both grooves being filled with said sealing material.

3. A gasket according to claim 1 in which the eyelet is substantially flat on one side of the gasket.

4. A gasket according to claim 1 in which the sealing material extends over at least part of the secondary sealing portion of the eyelet.

5. A gasket according to claim 4 in which the sealing material extends over the whole of the secondary portion of the eyelet and on to the flat body portion.

6. A gasket according to claim 1 in which the eyelet comprises folded sheet metal.

7. A gasket according to claim 1 in which the rubbery sealing material is a cured silicone rubber.

* * * * *